United States Patent [19]
Zinnen

[11] Patent Number: 4,770,819
[45] Date of Patent: Sep. 13, 1988

[54] PROCESS FOR SEPARATING DI- AND TRIGLYCERIDES

[75] Inventor: Hermann A. Zinnen, Evanston, Ill.

[73] Assignee: UOP Inc., Des Plaines, Ill.

[21] Appl. No.: 70,748

[22] Filed: Jul. 6, 1987

[51] Int. Cl.⁴ ........ C09F 5/10
[52] U.S. Cl. ........ 260/428.5; 260/410.1; 260/420; 260/428
[58] Field of Search ........ 260/420, 428, 428.5, 260/410.7

[56] References Cited

U.S. PATENT DOCUMENTS

| | | | |
|---|---|---|---|
| 2,639,289 | 5/1953 | Vogel | 260/428 |
| 4,048,205 | 9/1977 | Neuzil et al. | 260/428 |
| 4,277,412 | 7/1981 | Logan et al. | 260/428.5 |
| 4,284,580 | 8/1981 | Logan et al. | 260/428.5 |
| 4,297,292 | 10/1981 | Logan et al. | 260/428.5 |
| 4,353,838 | 10/1982 | Cleary et al. | 260/419 |

OTHER PUBLICATIONS

Jacobsbert et al., Studies in Palm Oil Crystallization, J. A. Oil Chem. Soc., vol. 53, Oct. 1976, pp. 609-617.

*Primary Examiner*—Werren B. Lone
*Assistant Examiner*—Vera C. Clarke
*Attorney, Agent, or Firm*—Thomas K. McBride; John F. Spears, Jr.; Jack H. Hall

[57] ABSTRACT

The separation of diglycerides from triglycerides is performed by an adsorptive chromatographic process in liquid phase with Li-, K-, or hydrogen-exchanged omega zeolites or silica as the adsorbent. A ketone/n-aliphatic hydrocarbon mixture can be selected as the desorbent.

7 Claims, 3 Drawing Sheets

PROCESS FOR SEPARATING DI- AND TRIGLYCERIDES

FIELD OF THE INVENTION

The field of art to which this invention belongs is the solid bed adsorptive separation of glycerides. More specifically, the invention relates to a process for separating diglycerides from triglycerides by a process which employs a lithium, potassium or hydrogen ion-exchanged omega zeolite or a silica adsorbent.

BACKGROUND OF THE INVENTION

The separation of many classes of compounds by selective adsorption on molecular sieves or zeolites as well as other adsorbents is well known. For example, as disclosed in U.S. Pat. No. 4,048,205, methyl esters of fatty acids of various degrees of unsaturation may be separated from mixtures of esters of saturated and unsaturated fatty acids with X or Y zeolites exchanged with a selected cation. Further in U.S. Pat. No. 4,353,838 it is disclosed that monoethanoid fatty acids may be separated from diethanoid fatty acids with cross-linked polystyrenes, e.g. "Amberlite". The refining of oils by admixing them with magnesium silicate to adsorb coloring matter and free fatty acids from glyceride oils is disclosed in U.S. Pat. No. 2,639,289. The separation of monoglycerides from di- and triglycerides by adsorption on X or Y zeolites with desorption by a ketone was disclosed in my pending application Ser. No. 898,300, filed Aug. 20, 1986. The process for separating a mixture of triglycerides, based on the iodine values, is shown in Logan et al. U.S. Pat. Nos. 4,277,412 and 4,284,580 in which permutite and aluminated silica gel adsorbents, respectively, can be used. Also, Logan et al. U.S. Pat. No. 4,297,292 discloses fractionating triglycerides according to their iodine value with a macroreticular strong acid cation exchange resin.

The process of separating diglycerides from triglycerides described herein has many potential uses, for example, in treating oils, such as palm oil and palm olein. Diglycerides are undesirable because they adversely affect the purification of triglycerides by crystallization. Jacobsberg et al., Studies in Palm Oil Crystallization, J. A. Oil Chem. Soc., Vol. 53, October 1976, pp. 609–617. A process which separates diglycerides from triglycerides can improve the purity and recovery of such crystallizations. Another application of my separation process results from the use of diglycerides as emulsifiers in large amounts in the food industry. Mixtures of di- and triglycerides can be produced by reaction of glycerol with triglycerides or with free fatty acids, separation of the resulting mixture yields the desired diglyceride.

Another important application of my separation process resides in its utility in the synthesis of triglycerides. Cocoa butter, for example, is a high value natural product consisting predominantly of a mixture of particular triglycerides where the 2-position of glycerol is esterified with an oleyl group and the 1- and 3-positions are esterified with either the palmitoyl or the stearyl group. When the 1 and 3-positions are esterified with palmitoyl groups, the triglyceride is referred to as "POP". Likewise, when a stearyl group occupies both 1-and 3-positions, the compound is called "SOS", and when 1- and 3-positions are filled by one palmitoyl and one stearyl group, the compound is referred to as "SOP". Cocoa butter is a predominant component in chocolate confections. It is believed that large quantities of these particular triglycerides could be synthesized and used as cocoa butter extenders by reacting the appropriate 1,3-diglyceride with oleic acid, and then separating the resulting mixture of di- and triglycerides. The process of the instant invention can be used to accomplish this by separation of glyceride mixtures which contain 1,3-diglycerides, obtaining the desired 1,3-diglycerides in the extract and triglyceride in the raffinate. The 1,3-diglycerides can then be recycled to the reaction step.

I have discovered combinations of zeolites and desorbents which separate the diglycerides and triglycerides. The diglycerides are adsorbed in preference to triglycerides and are concentrated in the extract. The triglycerides, therefore, are removed from the mixture of diglycerides and triglycerides and are concentrated in the raffinate of the adsorptive separation apparatus.

SUMMARY OF THIS INVENTION

The present invention is a process for separating diglycerides from a feed mixture comprising one or more diglycerides and at least one triglyceride. The process comprises contacting the mixture at adsorption conditions with an adsorbent comprising an omega type zeolite exchanged with potasssium, lithium or hydrogen ion, or silica. The diglyceride is selectively adsorbed to the substantial exclusion of the triglycerides. Next, the diglyceride is desorbed by a liquid ketone or a mixture of a ketone and paraffin desorbents. Triglycerides are removed before the diglycerides and, together with part of the desorbent, constitute the raffinate. The desorbent may be selected from the ketones having up to 7 carbons, e.g., acetone, the pentanones, hexanones and heptanones. Specific examples of desorbent liquids useful in the process are acetone, methylethyl ketone, diethyl ketone, methylpropyl ketone, 2-hexanone, 2-heptanone, etc. and mixtures thereof with paraffin hydrocarbons, such as isooctane, hexane, etc. Other desorbent materials which may function in the separation of di- and triglycerides are esters, ethers, aromatic compounds, olefins and alcohols.

The steps of the process are: (a) maintaining net fluid flow through a column of the adsorbent in a single direction, which column contains at least three zones having separate operational functions occurring therein and being serially interconnected with the terminal zones of the column connected to provide a continuous connection of the zones; (b) maintaining an adsorption zone in the column, the zone defined by the adsorbent located between a feed input stream at an upstream boundary of the zone and a raffinate output stream at a downstream boundary of the zone; (c) maintaining a purification zone immediately upstream from the adsorption zone, the purification zone defined by the adsorbent located between an extract output stream at an upstream boundary of the purification zone and the feed input stream at a downstream boundary of the purification zone; (d) maintaining a desorption zone immediately upstream from the purification zone, the desorption zone defined by the adsorbent located between a desorbent input stream at an upstream boundary of the zone and the extract output stream at a downstream boundary of the zone; (e) passing the feed mixture into the adsorption zone at adsorption conditions to effect the selective adsorption of the diglycerides by the adsorbent in the adsorption zone and withdrawing a raffinate output stream from the adsorption zone; (f) passing a desorbent material into the desorption zone at desorption conditions to effect the displacement of the diglycerides from the adsorbent in the desorption zone; (g) withdrawing an extract output stream comprising diglycerides and desorbent material from the desorption zone; (h) withdrawing a raffinate output stream comprising triglycerides from the desorption zone; (i) periodically advancing through the column of adsorbent in a downstream direction with respect to fluid flow in the adsorption zone, the feed input stream, raffinate output stream, desorbent input stream, and extract output stream to effect the shifting of zones through the adsorbent and the production of extract output and raffinate output streams.

Other embodiments of my invention encompass details about feed mixtures, adsorbents, desorbent materials and operating conditions all of which are hereinafter disclosed in the following discussion of each of the facets of the present invention.

DESCRIPTION OF THE INVENTION

The following definitions of various terms used throughout this specification will be used in describing the operation, objects and advantages of the present invention.

A "feed mixture" is a mixture containing one or more extract components and one or more raffinate components to be fed to an adsorbent of the process. The term "feed stream" indicates a stream of feed mixture which passes to an adsorbent used in the process.

An "extract component" is a type of compound or a compound that is more selectively adsorbed by the adsorbent while a "raffinate component" is a compound or type of compound that is less selectively adsorbed. In this process, diglycerides are extract components and the triglycerides are raffinate components. The term "raffinate stream" or "raffinate output stream" means a stream through which a raffinate component is removed from an adsorbent. The composition of the raffinate stream can vary from essentially 100% desorbent material (hereinafter defined) to essentially 100% raffinate components. The term "extract stream" or "extract output stream" shall mean a stream through which an extract material which has been desorbed by a desorbent material is removed from the adsorbent. The composition of the extract stream, likewise, can vary from essentially 100% desorbent material to essentially 100% extract components. Although it is possible by the process of this invention to produce high-purity extract product (hereinafter defined) or a raffinate product (hereinafter defined) at high recoveries, it will be appreciated that an extract component is never completely adsorbed by the adsorbent, nor is a raffinate component completely nonadsorbed by the adsorbent. Therefore, small amounts of a raffinate component can appear in the extract stream, and likewise, small amounts of an extract component can appear in the raffinate stream. The extract and raffinate streams then are further distinguished from each other and from the feed mixture by the ratio of the concentrations of an extract component and a specific raffinate component, both appearing in the particular stream. For example, in one embodiment, the ratio of the concentration of the more selectively adsorbed diglyceride to the concentration of less selectively adsorbed triglycerides will be highest in the extract stream, next highest in the feed mixture, and lowest in the raffinate stream. Likewise, the ratio of the less selectively adsorbed triglycerides to the more selectively adsorbed diglycerides will be highest in the raffinate stream, next highest in the feed mixture, and the lowest in the extract stream. The term "desorbent material" shall mean generally a material capable of desorbing an extract component. The term "desorbent stream" or "desorbent input stream" indicates the stream through which desorbent material passes to the adsorbent. When the extract stream and the raffinate stream contain desorbent materials, at least a portion of the extract stream and preferably at least a portion of the raffinate stream from the adsorbent will be passed to separation means, typically fractionators, where at least a portion of the desorbent material will be separated at separation conditions to produce an extract product and a raffinate product. The terms "extract product" and "raffinate product" mean products produced by the process containing, respectively, an extract component and a raffinate component in higher concentrations than those found in the respective extract stream and the raffinate stream. The term "selective pore volume" of the adsorbent is defined as the volume of the adsorbent which selectively adsorbs extract components from a feed mixture. The term "nonselective void volume" of an adsorbent is the volume of an adsorbent which does not selectively retain an extract component from a feed mixture. This volume includes the cavities of the adsorbent which contain no adsorptive sites and the interstitial void spaces between adsorbent particles. The selective pore volume and the nonselective void volume are generally expressed in volumetric quantities and are of importance in determining the proper flow rates of fluid required to be passed into the process for efficient operations to take place for a given quantity of adsorbent.

The term "desorbent material" as used herein shall mean any fluid substance capable of removing a selectively adsorbed feed component from the adsorbent. Generally, in a swing-bed system in which the selectively adsorbed feed component is removed from the adsorbent by a purge stream, desorbent material selection is not too critical and desorbent materials comprising gaseous hydrocarbons such as methane, ethane, etc., or other types of gases such as nitrogen or hydrogen may be used at elevated temperatures or reduced pressures or both to effectively purge the adsorbed feed component from the adsorbent. However, in adsorptive separation processes which employ zeolitic adsorbents and which are generally operated continuously at substantially constant pressures and temperatures to ensure liquid phase, the desorbent material relied upon must be judiciously selected to satisfy several criteria. First, the desorbent material must displace the extract components from the adsorbent with reasonable mass flow rates without itself being so strongly adsorbed as to unduly prevent the extract from displacing the desorbent material in a following adsorption cycle. Expressed in terms of the selectivity (hereinafter discussed in more detail), it is preferred that the adsorbent be more selective for the extract component with respect to a raffinate component than it is for the desorbent material with respect to a raffinate component. Secondly, desorbent materials must be compatible with the particular adsorbent and the particular feed mixture. More specifically, the desorbent must not react with either the adsorbent or any component of the feed material and must not reduce or destroy the critical selectivity of the adsorbent for the extract components with respect to the raffinate component. Desorbent materials to be used in the process of this invention should additionally be substances which are easily separable from the feed mixture that is passed into the process. After desorbing the extract components of the feed, both desorbent material and the extract components are typically removed in admixture from the adsorbent. Likewise, one or more raffinate components is typically withdrawn from the adsorbent in admixture with desorbent material and without a method of separating at least a portion of desorbent material, such as distillation, neither the purity of the extract product nor the purity of the raffinate product would be very high. It is, therefore, contemplated that any desorbent material used in this process will have a substantially different average boiling point than that of the feed mixture to allow separation of desorbent material from feed components in the extract and raffinate streams by simple fractionation thereby permitting reuse of desorbent material in the process. The term "substantially different" as used herein shall mean that the difference between the average boiling points between the desorbent material and the feed mixture shall be at least about 5° C. The boiling range of the desorbent material may be higher or lower than that of the feed mixture.

In the preferred isothermal, isobaric, liquid-phase operation of the process of this invention, ketones, e.g., methylethyl ketone, diethyl ketone, acetone and mixtures of a ketone and a paraffinic hydrocarbon, e.g. hexane and isooctane, have been found to be effective desorbents.

The prior art has recognized that certain characteristics of adsorbents are highly desirable, if not absolutely necessary, to the successful operation of a selective adsorption process. Among such characteristics are: adsorptive capacity for some volume of an extract component per volume of adsorbent; the selective adsorption of an extract component with respect to a raffinate component and the desorbent material; and sufficiently fast rates of adsorption and desorption of the extract components to and from the adsorbent.

Capacity of the adsorbent for adsorbing a specific volume of one or more extract components is, of course, a necessity; without such capacity the adsorbent is useless for adsorptive separation. Furthermore, the higher the adsorbent's capacity for an extract component the better is the adsorbent. Increased capacity of a particular adsorbent makes it possible to reduce the amount of adsorbent needed to separate the extract component contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life.

The second necessary adsorbent characteristic is the ability of the adsorbent to separate components of the feed; or, in other words, that the adsorbent possess adsorptive selectivity, (B), for one component as compared to another component. Relative selectivity can be expressed not only for one feed component as compared to another, but can also be expressed between any feed mixture component and the desorbent material. The selectivity, (B), as used throughout this specification is defined as the ratio of the two components of the adsorbed phase over the ratio of the same two components in the unadsorbed phase at equilibrium conditions.

Relative selectivity is shown as Equation 1 below:

$$\text{Selectivity} = (B) = \frac{[\text{vol. percent } C/\text{vol. percent } D]_A}{[\text{vol. percent } C/\text{vol. percent } D]_U} \qquad \text{Equation 1}$$

where C and D are two components of the feed represented in volume percent and the subscripts A and U represent the adsorbed and unadsorbed phases, respectively. The equilibrium conditions are determined when the feed passing over a bed of adsorbent does not change composition after contacting the bed of adsorbent. In other words, there is no net transfer of material occurring between the unadsorbed and adsorbed phases.

Where selectivity of two components approaches 1.0 there is no preferential adsorption of one component by the adsorbent with respect to the other; they are both adsorbed (or nonadsorbed) to about the same degree with respect to each other. As the (B) becomes less than or greater than 1.0 there is a preferential adsorption by the adsorbent for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. While separation of an extract component from a raffinate component is theoretically possible when the selectivity of the adsorbent for the extract component with respect to the raffinate component just exceeds a value of 1.0, it is preferred that such selectivity have a value approaching or exceeding 2. Like relative volatility, the higher the selectivity the easier the separation is to perform. Higher selectivities permit a smaller amount of adsorbent to be used in the process. Ideally, desorbent materials should have a selectivity equal to about 1 or less than 1 with respect to all extract components so that all of the extract components can be extracted as a class and all raffinate components clearly rejected into the raffinate stream.

The third important characteristic is the rate of exchange of the extract component of the feed mixture material with the desorbent material or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and, therefore, permit a reduction in the operating cost of the process. With faster rates of exchange, less desorbent material has to be pumped through the process and separated from the extract stream for reuse in the process.

In order to test various adsorbents and desorbent material with a particular feed mixture to measure the adsorbent characteristics of adsorptive capacity and selectivity and exchange rate, a dynamic testing apparatus is employed. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure.

A pulse test, performed using this apparatus and the following general procedure, is used to determine selectivities and other data for various adsorbent systems. The adsorbent is filled to equilibrium with a particular desorbent by passing the desorbent material through the adsorbent chamber. At a convenient time, a pulse of feed containing known concentrations of a nonadsorbed tracer of n-tetradecane (n-$C_{14}$), for instance, and of the particular feed material all diluted in desorbent is injected for a duration of several minutes. Desorbent flow is resumed, and the tracer and the glycerides are eluted as in a liquid-solid chromatographic operation. The effluent samples can be collected periodically and later analyzed separately by gas or liquid chromatography, and traces of the envelopes of corresponding component peaks developed.

From information derived from the chromatographic traces, adsorbent performance can be rated in terms of capacity. index for an extract component, selectivity for one isomer with respect to the other, and the rate of desorption of an extract component by the desorbent. The capacity index may be characterized by the distance between the center of the peak envelope of the selectively adsorbed isomer and the peak envelope of the tracer component or some other known reference point. It is expressed in terms of the volume in cubic centimeters of desorbent pumped during this time interval. Selectivity, (B), for an extract component with respect to a raffinate component may be characterized by the ratio of the distance between the center of an extract component peak envelope and the tracer peak envelope (or other reference point) to the corresponding distance between the center of a raffinate component peak envelope and the tracer peak envelope. The rate of exchange of an extract component with the desorbent can generally be characterized by the width of the peak envelopes at half intensity. The narrower the peak width the faster the desorption rate. The desorption rate can also be characterized by the distance between the center of the tracer peak envelope and the disappearance of an extract component which has just been desorbed. This distance is again the volume of desorbent pumped during this time interval.

One adsorbent which can be used in the process of this invention comprises specific crystalline aluminosilicates. Crystalline aluminosilicates such as that encompassed by the present invention include crystalline aluminosilicate cage structures in which the alumina and silica tetrahedra are intimately connected in an open three-dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as "molecular sieves" when the separation which they effect is dependent essentially upon differences between the sizes of the feed molecules as, for instance, when smaller normal paraffin molecules are separated from larger isoparaffin molecules by using a particular molecular sieve. In the process of this invention, however, the term "molecular sieves," although widely used, is not strictly suitable since the separation of specific glycerides is apparently dependent on differences in electrochemical attraction of the different glycerides and the adsorbent rather than solely on physical size differences in the glyceride molecules.

In hydrated form, the crystalline aluminosilicates generally encompass those zeolites represented by the Formula below:

$$M_{2/n}O{:}Al_2O_3{:}wSiO_2{:}yH_2O \quad \text{Formula 1}$$

where "M" is a cation which balances the electrovalence of the tetrahedra and is generally referred to as an exchangeable cationic site, "n" represents the valence of the cation, "w" represents the moles of $SiO_2$, and "y" represents the moles of water. The generalized cation "M" may be monovalent, divalent or trivalent cations or mixtures thereof.

The omega type structured zeolites can be represented by the following probable structure (Barrer et al., Probable Structure of Zeolite Ω, Chemical Communications, 1969, pp. 659, 660).

$$6.8Na^+,1.6TMA^+[Al_8Si_{28}O_{72}]21H_2O \quad \text{Formula 2}$$

where "TMA" is tetramethyl ammonium. The $SiO_2$/$Al_2O_3$ mole ratio for the hydrogen exchanged type omega structured zeolites is about 7.13.

The present invention is based on the discovery that the omega type zeolite with lithium, potassium or hydrogen cations at exchangeable cation sites is more selective for the diglycerides than for the triglycerides and that silica is likewise more selective for the diglycerides than the triglycerides.

Typically, adsorbents used in separative processes contain the crystalline material dispersed in an amorphous binder material or inorganic matrix, having channels and cavities therein which enable liquid access to the crystalline material. Silica or alumina are typical of such inorganic matrix materials. The binder aids in forming or agglomerating the crystalline particles which otherwise would comprise a fine powder. The adsorbent may thus be in the form of particles such as extrudates, aggregates, tablets, macrospheres or granules having a desired particle range, preferably from about 16 to about 60 mesh (Standard U. S. Mesh).

The adsorbent may be employed in the form of a dense fixed bed which is alternately contacted with a feed mixture and a desorbent material in which case the process will be only semicontinuous. In another embodiment, a set of two or more static beds of adsorbent may be employed with appropriate valving so that a feed mixture can be passed through one or more adsorbent beds of a set while a desorbent material is passed through one or more of the other beds in a set. The flow of a feed mixture and a desorbent material may be either up or down through an adsorbent in such beds. Any of the conventional apparatus employed in a static bed fluid-solid contacting may be used.

Moving bed or simulated moving bed flow systems, however, have a much greater separation efficiency than fixed bed systems and are, therefore, preferred. In the moving bed or simulated moving bed processes, the retention and displacement operations are continuously taking place which allows both continuous production of an extract and a raffinate stream and the continual use of feed and displacement fluid streams. One preferred embodiment of this process utilizes what is known in the art as the simulated moving bed countercurrent flow system. In such a system, it is the progressive movement of multiple liquid access points down a molecular sieve chamber that simulates the upward movement of molecular sieve contained in the chamber. Reference can also be made to D. B. Broughton's U.S. Pat. No. 2,985,589, in which the operating principles and sequence of such a flow system are described, and to a paper entitled, "Continuous Adsorptive Processing—A New Separation Technique," by D. B. Broughton presented at the 34th Annual Meeting of the Society of Chemical Engineers at Tokyo, Japan on Apr. 2, 1969, both references incorporated herein by reference for further explanation of the simulated moving bed countercurrent process flow scheme.

Another embodiment of a simulated moving bed flow system suitable for use in the process of the present invention is the cocurrent high efficiency simulated moving bed process disclosed in U.S. Pat. No. 4,402,832 to Gerhold, incorporated by reference herein in its entirety.

It is contemplated that at least a portion of the extract output stream will pass into a separation means wherein at least a portion of the desorbent material can be separated at separating conditions to produce an extract product containing a reduced concentration of desorbent material. Preferably, but not necessary to the operation of the process, at least a portion of the raffinate output stream will also be passed to a separation means wherein at least a portion of the desorbent material can be separated at separating conditions to produce a desorbent stream which can be reused in the process and a raffinate product containing a reduced concentration of desorbent material. Typically, the concentration of desorbent material in the extract product and the raffinate product will be less than about 5 vol. % and more preferably less than about 1 vol. %. The separation means will typically be a fractionation column, the design and operation of which is well known to the separation art.

Although both liquid and vapor phase operations can be used in many adsorptive separation processes, liquid-phase operation is preferred for this process because of the high boiling points of the glycerides. Adsorption conditions will include a temperature range of from about 20° C. to about 250° C. with about 100° C. to about 200° C. being more preferred and a pressure sufficient to maintain liquid phase. Desorption conditions will include the same range of temperatures and pressure as used for adsorption conditions.

The size of the units which can utilize the process of this invention can vary anywhere from those of pilot-plant scale (see, for example, U.S. Pat. No. 3,706,812) to those of commercial scale and can range in flow rates from as little as a few cc's an hour up to many thousands of gallons per hour.

The following examples are presented for illustration purposes and more specifically are presented to illustrate the selectivity relationships that make the process of the invention possible. Reference to specific cations, desorbent materials, feed mixtures and operating conditions is not intended to unduly restrict the scope and spirit of the claims attached hereto.

EXAMPLE I

A static test was made to determine the ability of a selected adsorbent, K-omega zeolite, to separate diglycerides from triglycerides. In the test, a measured amount of adsorbent was placed in a container and a feed mixture added and allowed to stand until equilibrium was reached. The various fluids were measured to determine amount and composition of each to calculate the ratio, CF/CI, of the final concentration to the initial concentration of each component. The results are listed in Table 1.

TABLE 1

| | |
|---|---|
| Stock Solution: Diolein and Triolein in isooctane | 2.5 wt. % |
| Sieve and gm adsorbent | K-omega |
| per 0.5 cc feed solution | 0.1 gm |
| Initial ratio: Diolein/Triolein | 1.29 |
| Equilibrium ratio: Diolein/Triolein | 0.4 |
| CF/CI Diolein | 0.31 |
| CF/CI Triolein | 1.0 |
| Adsorbed Glyceride | Diolein |

EXAMPLE II

In this experiment, the pulse test was performed to evaluate the ability of the present invention to separate diglycerides from triglycerides. The feed mixture comprised 0.5 g cocoa butter (triglycerides), 0.5 g safflower oil (triglycerides), 0.15 g diglycerides and 1 cc desorbent. The triglycerides in the feed included the following, where L=linoleyl, O=oleyl, S=stearyl, P=palmitoyl: LLL, OLL, PLL, SLL, POL, OOL, POS, SOS, POP. The adsorbent used was silica (Merck) and can be prepared for this process by drying at 400° C. in air. The desorbent was 80% isooctane and 20% acetone.

The testing apparatus was the above-described pulse test apparatus. For this pulse test, the column was maintained at a temperature of 65° C. and a pressure of 50 psig. Liquid chromatographic analysis equipment was used to analyze the column effluent stream in order to determine the composition of the effluent material at given time intervals.

Figure 1:
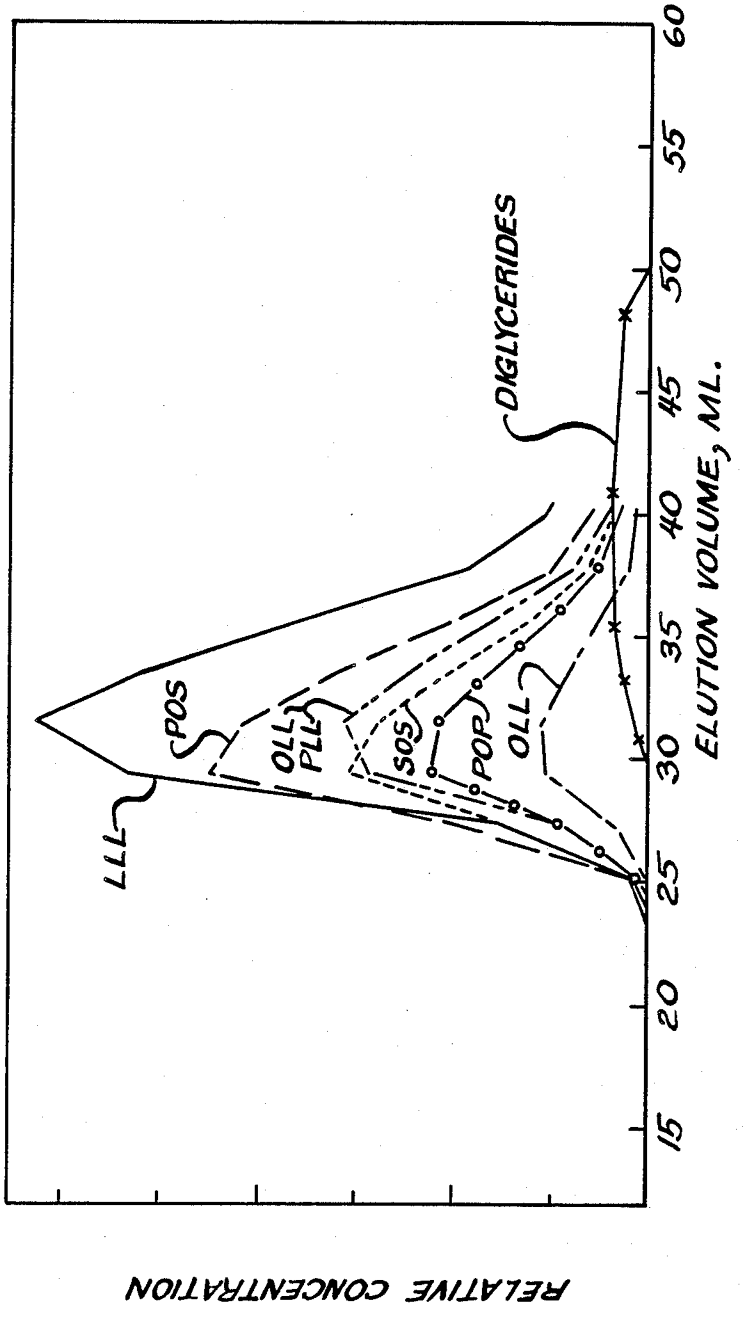
FIGS. 1-3 are chromatographic traces of the pulse tests described in Examples II through IV, illustrating the separations achieved with various adsorbents and desorbents.

The operations taking place were as follows. The desorbent material was run continuously at a flow rate of 1.3 cc/min. At some convenient time interval, a pulse of the feed mixture was introduced. The desorbent stream was then resumed and continued to pass into the adsorbent column until all of the feed components had been eluted from the column as determined by chromatographic analysis of the effluent material leaving the adsorption column. The column effluent is analyzed for its di- and triglyceride content; both triglycerides in the feed mixture are relatively unadsorbed and thus elute and are separated in the raffinate, while the diglycerides in the feed mixture are adsorbed by the adsorbent and eluted in the extract. The results of the test are illustrated in FIG. 1, which shows that the diglycerides are selectively adsorbed on the silica. The results are shown in Table 2.

TABLE 2

| Component Name | Net Retention Volume | Peak Width at Half-Height | Selectivity (B) |
|---|---|---|---|
| SOS | 0 | 7.56 | Tracer |
| LLL | 1.1 | 8.05 | Reference |
| Diglycerides | 9.4 | 16.6 | 8.54 |

EXAMPLE III

A similar pulse test was conducted in the same manner as Example II, except that the adsorbent was omega zeolite (ELZ-omega-6, Linde Division, Union Carbide Corp.) in hydrogen form, with a bentonite binder (15%) and finally dried in air at 600° C. The adsorbent was ground to 20–40 mesh. The feed was the same as in Example II, except that 0.2 g diglycerides was used. The desorbent was 25% methylethyl ketone (MEK) in isooctane and the flow rate was 1.32 cc/min.

The adsorbent so produced was used to evaluate the ability of the present invention to separate diglycerides from triglycerides.

Figure 2:
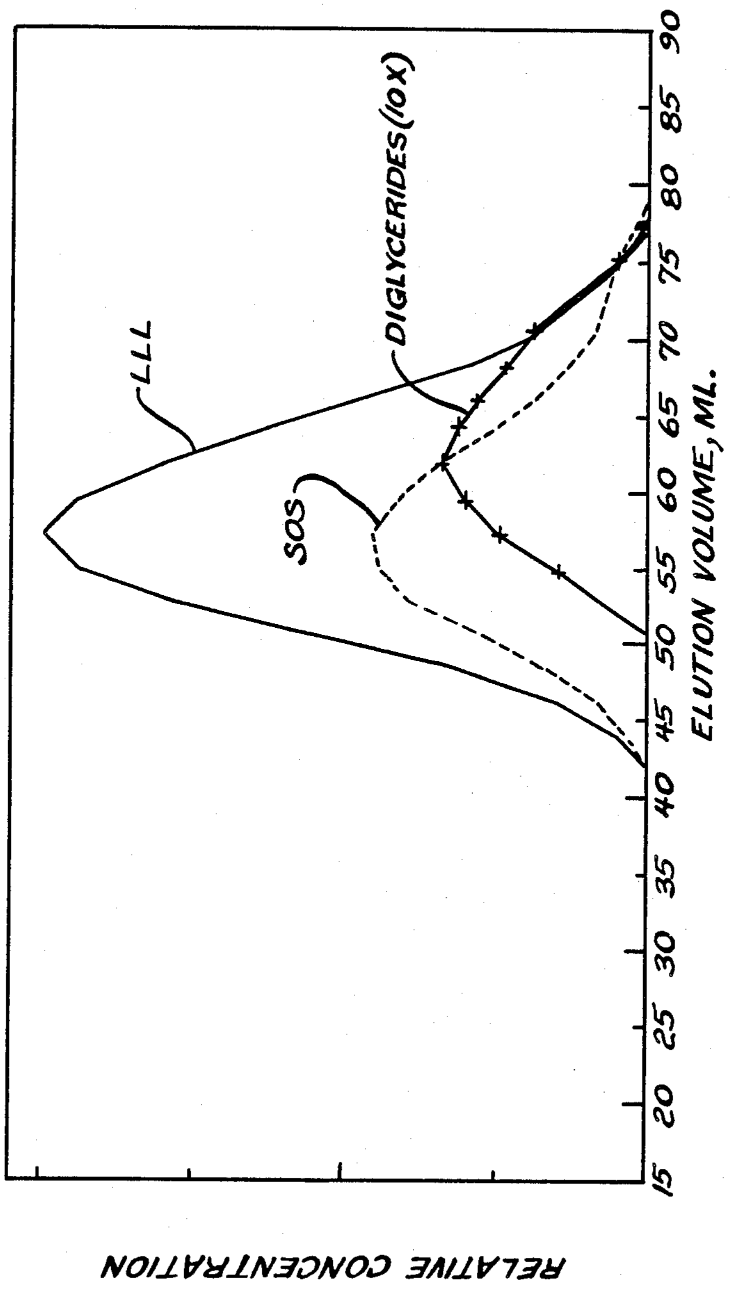

The results of the test of this Example are shown on the accompanying FIG. 2 which comprises the chromatographic trace.

It is clear from the test that the separation of diglycerides from triglycerides is readily achieved by the process of the present invention. Selectivities for the diglycerides relative to the triglycerides are determined from Equation 1. The selectivity and net retention volumes for various fractions are contained in the following Table 3.

TABLE 3

| Component Name | Net Retention Volume | Peak Width at Half-Height | Selectivity (B) |
|---|---|---|---|
| SOS | 0 | 16.1 | Tracer |
| LLL | 0.7 | 15.5 | Reference |
| Diglycerides | 5.9 | 15.9 | 8.43 |

EXAMPLE IV

The pulse test of Example III was repeated using an omega type molecular sieve without a binder. In this test, the zeolite was lithium exchanged. The teperature was 130° C. and the desorbent was 25 vol. % diethyl ketone in isooctane. The tracer was eicosane ($n-C_{20}$).

Figure 3:
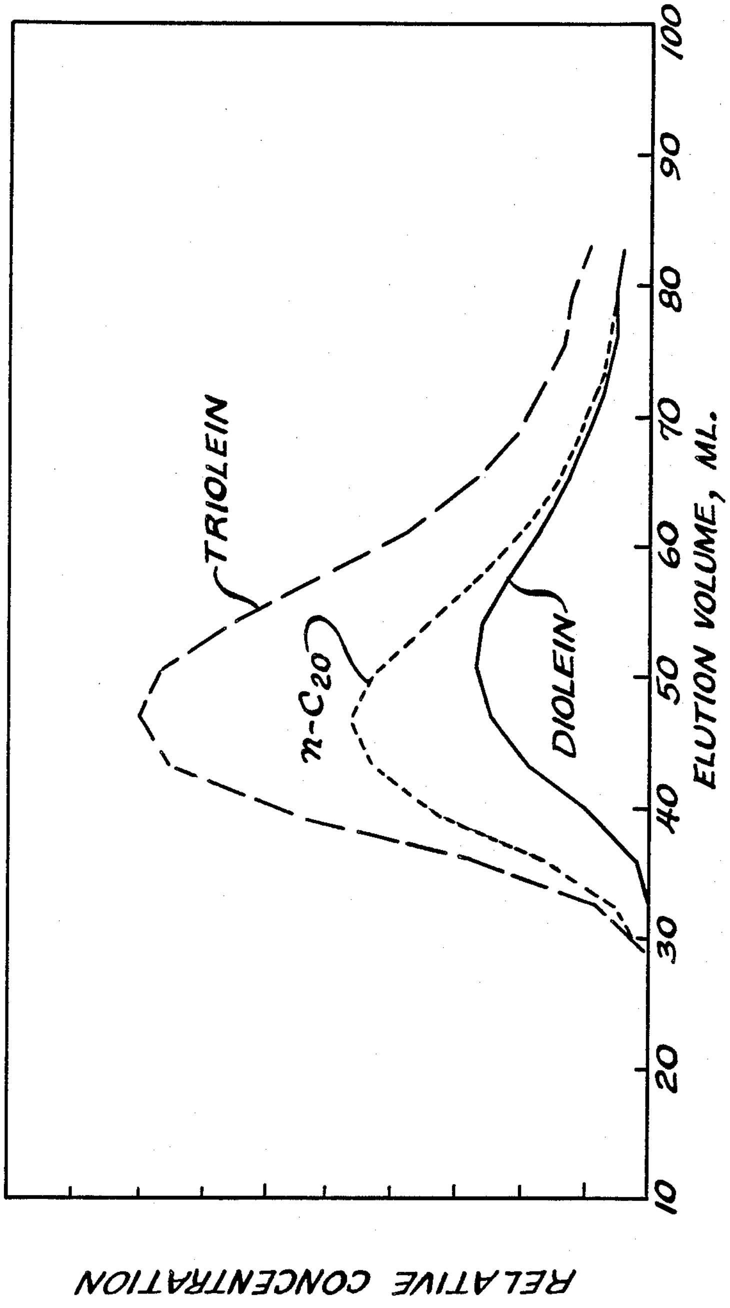

It is clear from FIG. 3 that the adsorbent of the present invention exhibits good selectivity (B) for the diglycerides.

The results are contained in Table 4 below.

TABLE 4

| Component Name | Net Retention Volume | Peak Width at Half-Height | Selectivity (B) |
|---|---|---|---|
| $n-C_{20}$ | 0 | 21.8 | Tracer |
| Triolein | 0.7 | 22.9 | Reference |
| Diolein | 4.4 | 23.3 | 6.29 |

What is claimed is:

1. A process for separating diglycerides from a mixture comprising diglycerides and at least one triglyceride, said process comprising contacting said mixture at adsorption conditions with an adsorbent selected from the group consisting of an omega-type zeolite exchanged with hydrogen, Li or K at exchangeable sites and silica thereby selectively adsorbing said diglyceride thereon and desorbing at desorption conditions said diglycerides with a desorbent selected from the group consisting of ketones and mixtures thereof with paraffin hydrocarbons.

2. The process of claim 1 wherein said desorbent is selected from the group consisting of ketones having up to 7 carbons and mixtures thereof with hexane.

3. The process of claim 1 wherein said adsorption conditions include a temperature within the range of from about 20° C. to about 200° C. and a pressure sufficient to maintain liquid phase.

4. The process of claim 1 wherein said desorbent material is a ketone selected from the group consisting of methylethyl ketone, diethyl ketone and acetone and a paraffin hydrocarbon.

5. A process for separating a diglyceride from a feed mixture comprising diglycerides and triglycerides, which process employs an adsorbent selected from the group consisting of an omega zeolite exchanged with Li, K or hydrogen and silica, which process comprises the steps of:

(a) maintaining net fluid flow through a column of said adsorbent in a single direction, which column contains at least three zones having separate operational functions occurring therein and being serially interconnected with the terminal zones of said column connected to provide a continuous connection of said zones;

(b) maintaining an adsorption zone in said column, said zone defined by the adsorbent located between a feed input stream at an upstream boundary of said zone and a raffinate output stream at a downstream boundary of said zone;

(c) maintaining a purification zone immediately upstream from said adsorption zone, said purification zone defined by the adsorbent located between an extract output stream at an upstream boundary of said purification zone and said feed input stream at a downstream boundary of said purification zone;

(d) maintaining a desorption zone immediately upstream from said purification zone, said desorption zone defined by the adsorbent located between a desorbent input stream at an upstream boundary of said zone and said extract output stream at a downstream boundary of said zone;

(e) passing said feed mixture into said adsorption zone at adsorption conditions to effect the selective adsorption of said diglyceride by said adsorbent in said adsorption zone and withdrawing a raffinate output stream from said adsorption zone;

(f) passing a desorbent material comprising an aromatic hydrocarbon or a ketone and mixtures thereof with paraffin hydrocarbons into said desorption zone at desorption conditions to effect the displacement of said diglyceride from the adsorbent in said desorption zone;

(g) withdrawing an extract output stream comprising said diglyceride and desorbent material from said desorption zone;

(h) withdrawing a raffinate output stream comprising said triglyceride from said desorption zone; and (i) periodically advancing through said column of adsorbent in a downstream direction with respect to fluid flow in said adsorption zone the feed input stream, raffinate output stream, desorbent input stream, and extract output stream to effect the shifting of zones through said adsorbent and the production of extract output and raffinate output stream.

6. The process of claim 5 wherein said adsorption and desorption conditions include a temperature within the range of from about 20° C. to about 200° C. and a pressure sufficient to maintain liquid phase.

7. The process of claim 5 wherein a buffer zone is maintained immediately upstream from said desorption zone, said buffer zone is defined as the adsorbent located between the desorbent input stream as the downstream boundary of said buffer zone and the raffinate output stream at an upstream boundary of said buffer zone.

* * * * *